United States Patent [19]
Leeper et al.

[11] Patent Number: 5,740,542
[45] Date of Patent: Apr. 14, 1998

[54] METHOD OF TRANSMITTING DATA DURING VOICE PAUSES IN A SYNCHRONOUS COMMUNICATION SYSTEM

[75] Inventors: David G. Leeper, Scottsdale; Ralph C. Gregg, Jr., Tempe; Keith Andrew Olds, Mesa, all of Ariz.

[73] Assignee: Motorola, Inc., Schaumburg, Ill.

[21] Appl. No.: 510,529

[22] Filed: Aug. 2, 1995

[51] Int. Cl.$^6$ .............................. H04B 7/26; H04B 7/212
[52] U.S. Cl. .......................... 455/516; 455/517; 370/347; 370/493
[58] Field of Search .................................. 455/12.1, 13.1, 455/33.1, 34.1, 34.2, 54.1, 54.2, 427, 434, 445, 450, 455, 509, 515, 516, 517; 370/314, 337, 347, 913, 493

[56] References Cited

U.S. PATENT DOCUMENTS

| | | |
|---|---|---|
| 4,813,040 | 3/1989 | Futato ...................................... 370/111 |
| 5,481,539 | 1/1996 | Hershey et al. ................... 455/54.1 X |

FOREIGN PATENT DOCUMENTS

| | | |
|---|---|---|
| 0629064 | 6/1994 | France . |
| 156765A | 2/1985 | Germany . |
| 2294614 | 10/1994 | United Kingdom . |
| 9613916 | 10/1995 | WIPO . |

*Primary Examiner*—Chi H. Pham
*Attorney, Agent, or Firm*—Kevin K. Johanson

[57] ABSTRACT

A communication system (10), having dynamic nodes such as satellites (12), require narrow-tolerance communication parameters such as timing and frequency. A voice subscriber unit (26) establishes a traffic channel (17) by negotiating communication parameters. A user of voice subscriber unit (26) generates inherent voice pauses in communications. A data subscriber unit (31) possess a datagram for delivery through communication system (10). Instead of negotiating a dedicated traffic channel for delivery of the datagram, data subscriber unit (31) monitors an active voice subscriber unit (26) and determines if the communication parameters used by voice subscriber unit (26) are compatible for data subscriber unit (31). Data subscriber unit (31), upon detecting a voice pause by voice subscriber unit (26), transmits the datagram to satellite (12) using the negotiated communication parameters of voice subscriber unit (26).

17 Claims, 3 Drawing Sheets

METHOD OF TRANSMITTING DATA DURING VOICE PAUSES IN A SYNCHRONOUS COMMUNICATION SYSTEM

FIELD OF THE INVENTION

The present invention relates generally to satellite-based communications, and, more particularly, to transmission of datagrams during voice pauses using a voice uplink channel.

BACKGROUND OF THE INVENTION

Wireless communication utilizes spectrum for each user's communication channel. Additionally, when large amounts of data are being sent, each channel is implemented as a connection; the connection is set up from source to destination before the communication begins.

While wireless connection-oriented services are useful for sending large amounts of data, setting up and clearing a connection requires substantial overhead, and the cost of setting up and clearing a connection can be high. Also, in a wireless communication system, spectrum is a scarce resource and establishing a separate communication channel for each user does not utilize spectrum efficiently.

To combat the problems of establishing a connection when sending short bursts of data, connectionless services are utilized. Connectionless services provide the convenience of not having to establish an independent or dedicated connection from source to destination to send short messages.

Historically, connection-oriented and connectionless communication could not be mixed on the same channel. Thus what is needed in a wireless communication system is a method for sharing the same channel to support both a connection-oriented and a connectionless service, thereby offering more efficient channel utilization.

Also, what is needed in a wireless communication system is a method of sending short bursts of data over a channel established for another user and routing the data burst as it is transmitted, instead of establishing a connection from source to destination before the data burst is transmitted.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF THE PREFERRED EMBODIMENT

Figure 1:
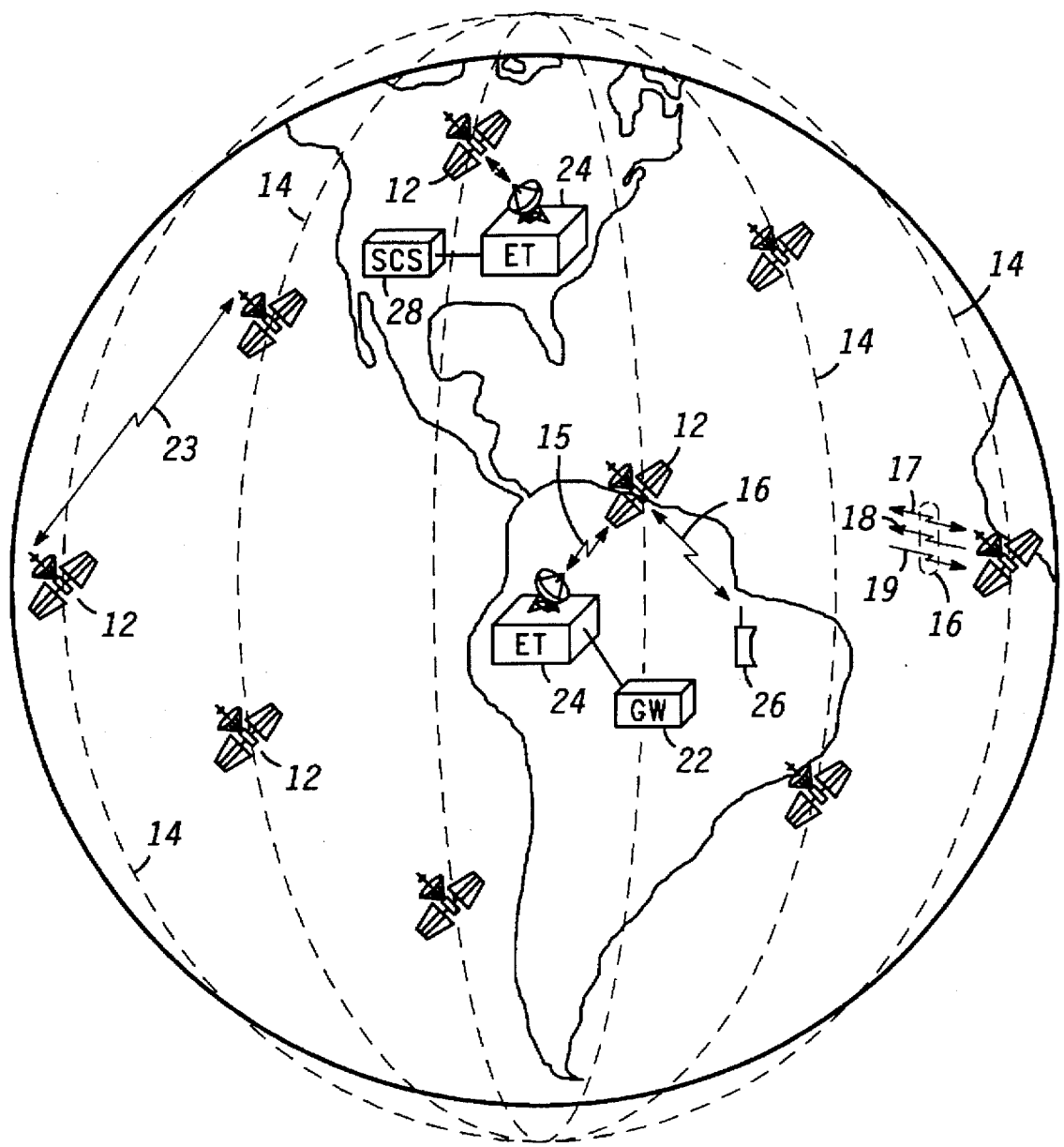
FIG. 1 depicts a highly simplified diagram of a satellite-based communication system of which the present invention may form a portion thereof.

FIG. 1 illustrates a highly simplified diagram of satellite-based communication system 10, dispersed over and surrounding earth through use of orbiting satellites 12 occupying orbits 14. The present invention is applicable to communication systems including satellites having low-earth and medium-earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of satellites 12 of the constellation.

For example, each orbit 14 encircles earth at an altitude of around 785 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of earth at any instant. For the example shown, satellites 12 travel with respect to earth at around 25,000 km/hr, allowing satellite 12 to be visible to a terrestrial station or VSUs 26 for a period of approximately nine minutes.

Satellites 12 communicate with terrestrial stations which may include some number of radio communication voice subscriber units (VSUs) 26 and earth terminals (ETs) 24 connected to system control segment (SCS) 28. ETs 24 may also be connected to gateways (GWs) 22 which provide access to a public switched telephone network (PSTN) or other communications facilities. Only one each of GWs 22, SCSs 28 and VSUs 26 are shown in FIG. 1 for clarity and ease of understanding. ETs 24 may be co-located with or separate from SCS 28 or GW 22. ETs 24 associated with SCSs 28 receive data describing status of satellites 12 and GWs 22 and relay packets of control information. ETs 24 associated with GWs 22 primarily receive and relay packets relating to calls in progress from/to VSUs 26 and satellites 12.

VSUs 26 may be located anywhere on the surface of the earth or in the atmosphere above the earth. VSUs 26 are preferably communications devices capable of transmitting data to and receiving data from satellites 12. By way of example, VSUs 26 may be hand-held, portable cellular telephones adapted to communicate with satellites 12. Ordinarily, VSUs 26 need not perform any control functions for communication system 10.

Communication system 10 may accommodate any number, potentially in the millions, of VSUs 26. In the preferred embodiments of the present invention, VSUs 26 communicate with nearby satellites 12 via subscriber links 16. Links 16 encompass a limited portion of the electromagnetic spectrum that is divided into numerous channels. Links 16 are preferably combinations of L-Band and/or K-Band frequency channels and may encompass Frequency Division Multiple Access (FDMA) and/or Time Division Multiple Access (TDMA) and/or Code Division Multiple Access (CDMA) communications or combinations thereof. At a minimum, satellite 12 regularly transmits over one or more broadcast channels 18. VSUs 26 synchronize to broadcast channels 18 and monitor broadcast channels 18 to detect data messages which may be addressed to them. VSUs 26 may transmit messages to satellites 12 over one or more acquisition channels 19. Broadcast channels 18 and acquisition channels 19 are not dedicated to any one VSU 26 but are shared by all VSUs 26 currently within view of a satellite 12.

On the other hand, traffic channels 17 are two-way channels that are assigned to particular VSUs 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, at a minimum, a two-way voice conversation. To support real-time communications, a time division multiple access (TDMA) scheme is desirably used to divide time into frames, preferably in the 10–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through crosslinks 23. Thus, a call or communication from a VSU 26 located at any point on or near the surface of the earth may be routed through the constellation of satellites 12 to within range of substantially any other point on the surface of the earth. A communication may be routed down to a VSU 26 on or near the surface of the earth from a satellite 12 using subscriber link 16. Alternatively, a communication may be routed down to or up from any of many ETs 24, of which FIG. 1 shows only two, through earth links 15. ETs 24 are usually distributed over the surface of the earth in accordance with geopolitical boundaries. In the preferred embodiments, each satellite 12 may communicate with up to four ETs 24 and over a thousand VSUs 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communication systems, such as the PSTN, may access communication system 10 through GWs 22.

With the example constellation of sixty-six satellites 12, at least one of satellites 12 is within view of each point on the earth's surface at all times, resulting in full coverage of the earth's surface. Any satellite 12 may be in direct or indirect data communication with any VSU 26 or ET 24 at any time by routing data through the constellation of satellites 12. Accordingly, communication system 10 may establish a communication path for relaying data through the constellation of satellites 12 between any two VSUs 26, between SCS 28 and GW 22, between any two GWs 22 or between VSU 26 and GW 22.

The present invention is also applicable to satellite constellations where full coverage of the earth is not achieved (i.e., where there are "holes" in the communications coverage provided by the constellation) and constellations where plural coverage of portions of the earth occur (i.e., more than one satellite is in view of a point on the earth's surface).

In general terms, communication system 10 may be viewed as a network of nodes. Each satellite 12, GW 22, and VSU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTNs and/or conventional terrestrial cellular telephone devices coupled to the PSTN through conventional terrestrial base stations.

Figure 2:
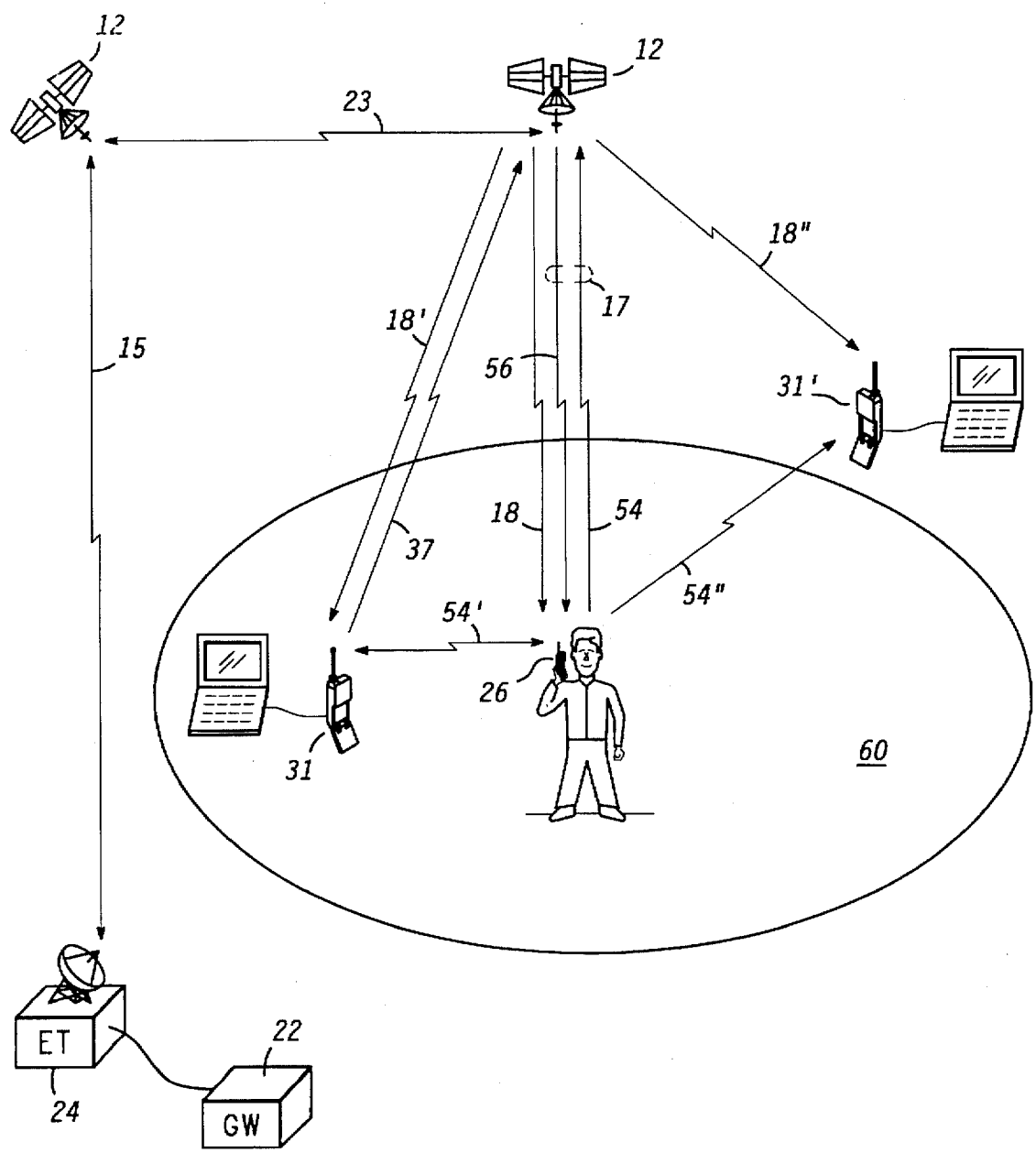
FIG. 2 depicts communication paths between a satellite, voice subscriber unit, data subscriber unit, and gateway, in accordance with an embodiment of the present invention.

FIG. 2 shows typical communication paths between a satellite, voice subscriber unit, data subscriber unit, and a gateway, in accordance with an embodiment of the present invention. In a preferred embodiment, a user having a VSU 26 initiates a communication session by monitoring broadcast channel 18 to determine first, if communication services are available and secondly, the spectrum and timeslot of acquisition channels 19.

VSU 26 then proceeds to refine communication parameters such as timing parameters inherent in synchronous TDMA communication systems and transmission frequency offsets injected by Doppler frequencies introduced by high-velocity orbiting base stations such as satellites 12. Satellite 12 evaluates the communication parameters employed by VSU 26 and provides feedback for refining both timing and frequency parameters in broadcast channel 18. VSU 26 adjusts subsequent transmissions in acquisition channel 19 (FIG. 1) until satellite 12 determines that communication parameters are sufficiently refined to non-interferingly operate in a narrowband traffic channel 17.

Satellites 12, through crosslinks 23 and earthlinks 15, cooperatively with gateway 22 establish a connection from VSU 26 to the terminating party as requested by the user of VSU 26. This connection process from point to point requires that resources be dedicated from VSU 26 to a terminating party for the duration of communication session. When a communication session is substantially longer in duration than the process to establish the session, then dedicating resources to establish a connection is warranted. However, communication resources are inefficiently employed when the duration of a communication session is a fraction or a small ratio of the time required to establish a connection.

In FIG. 2, a data subscriber unit (DSU) 31 is shown. DSUs 31 are non-real time devices for collecting or relaying small amounts of data commonly referred to as datagrams. DSUs 31 may be part of sensor devices for collecting sensor data for periodic delivery or DSUs 31 may be messaging devices not requiring immediate interaction with the destined recipient of the datagram. Also, VSU 26 and DSU 31 may be integrated into one unit. A DSU 31 could monitor broadcast channel 18' and laboriously negotiate a traffic channel 17 as described in the process above, however, for relatively small amounts of data in addition to the lack of the need for real-time interaction with a datagram recipient, establishing a dedicated traffic channel utilizes communication resources inefficiently.

A compatible communication parameter region 60 defines an area wherein DSU 31 and VSU 26 may employ equivalent communication parameters, propagation timing compensation and Doppler frequency offsets, to non-interferingly operate in a traffic channel 17. VSU's 26 transmission on uplink traffic channel 54 also radiates to DSU 31 through uplink traffic channel 54'. DSU 31 monitors the arrival of this signal in conjunction with the arrival of broadcast channel 18' and DSU 31 makes a determination that it falls within compatible communication parameter region 60.

For DSUs located outside of this compatibility region, such as DSU 31', modifications to communication parameters employed by VSU 26 are required in order to non-interferingly operate with satellite 12. DSU 31' determines by monitoring broadcast channel 18" and uplink traffic channel 54" that it inherently has different propagation characteristics such as delay timing and Doppler frequencies that place any transmissions by DSU 31' employing the communication parameters of VSU 26 in an interfering condition. Such a condition may be the overlapping of an adjacent timeslot or frequency interference due to the Doppler variations between VSU 26 and DSU 31'.

VSU 26 digitizes audio voice signals and transmits the digitized voice in a single short high speed burst during an allotted time-slot in uplink traffic channel 54. Voice conversations are inherently aperiodic for a number of reasons, such as longer dialogs by one party, thought time required by users for processing, evaluating, and forming a response, or propagation time of communications through a system. This aperiodicity creates "voice pauses" where no voice packets are being transmitted by VSU 26 on uplink traffic channel 54.

DSU 31 monitors VSU 26 and detects these voice pauses when uplink traffic channel 54' becomes idle. DSU 31 while monitoring VSU 26, anticipates an eventual idle frame and addresses and packages the datagram. When DSU 31 detects a voice pause, DSU 31, employing timing and frequency communication parameters as exhibited by VSU 26 during previous monitoring, transmits the datagram in datagram uplink traffic channel 37.

Satellite 12 receives the datagram in the non-interfering time and frequency slot as negotiated with VSU 26. Satellite 12 evaluates the addressing portion and detects that this datagram is not a digitized voice packet from VSU 26. Rather than discarding the datagram, satellite 12 routes the datagram to the nearest gateway 22 for evaluation and forwarding as addressed. This forwarding may include wrapping the datagram in additional addressing protocol and launching the datagram back into the constellation of satellites for delivery, or gateway 22 may use a terrestrial network for datagram delivery. Additionally, satellites 12 may be sufficiently sophisticated and perform destination routing on the datagram without the need for an intermediate gateway interaction.

When DSU 31 transmits a datagram on datagram uplink traffic channel 37 that coincides with a digitized voice transmission by VSU 26, the simultaneous packets may interfere at satellite 12. The corruption of a voice packet in a conversation generally is not catastrophic as fractional dropouts of voice can generally be reconstructed by the human ear. If a user cannot reconstruct the corrupted voice packet, then the voice users may simply prompt the other user to repeat themselves. A DSU 31 would not readily know if a datagram had been corrupted. However, in the preferred embodiment, satellite 12 upon receiving a valid datagram utilizes broadcast channel 18' to transmit an addressed acknowledgment to DSU 31. If DSU 31 does not receive an acknowledgment, processing returns to task 102 of FIG. 3.

Users typically employ datagrams for delivering data that is timely if it arrives within a timing window. When a VSU 26 initiates communications and establishes a traffic channel 17 within the datagram's timing delivery window, then DSU 31 may deliver timely datagrams. However, if communications by VSU 26 are delayed or sparse, DSU 31 may resort to other techniques to timely deliver datagrams. In the preferred embodiment, DSU 31 contains a timer that allows it to wait and monitor for the initiation of a traffic channel. If this timer expires without having located a usable neighboring traffic channel, DSU 31 initiates a connection process as described above to establish a dedicated traffic channel 17 allowing DSU 31 to deliver a timely datagram.

Figure 3:
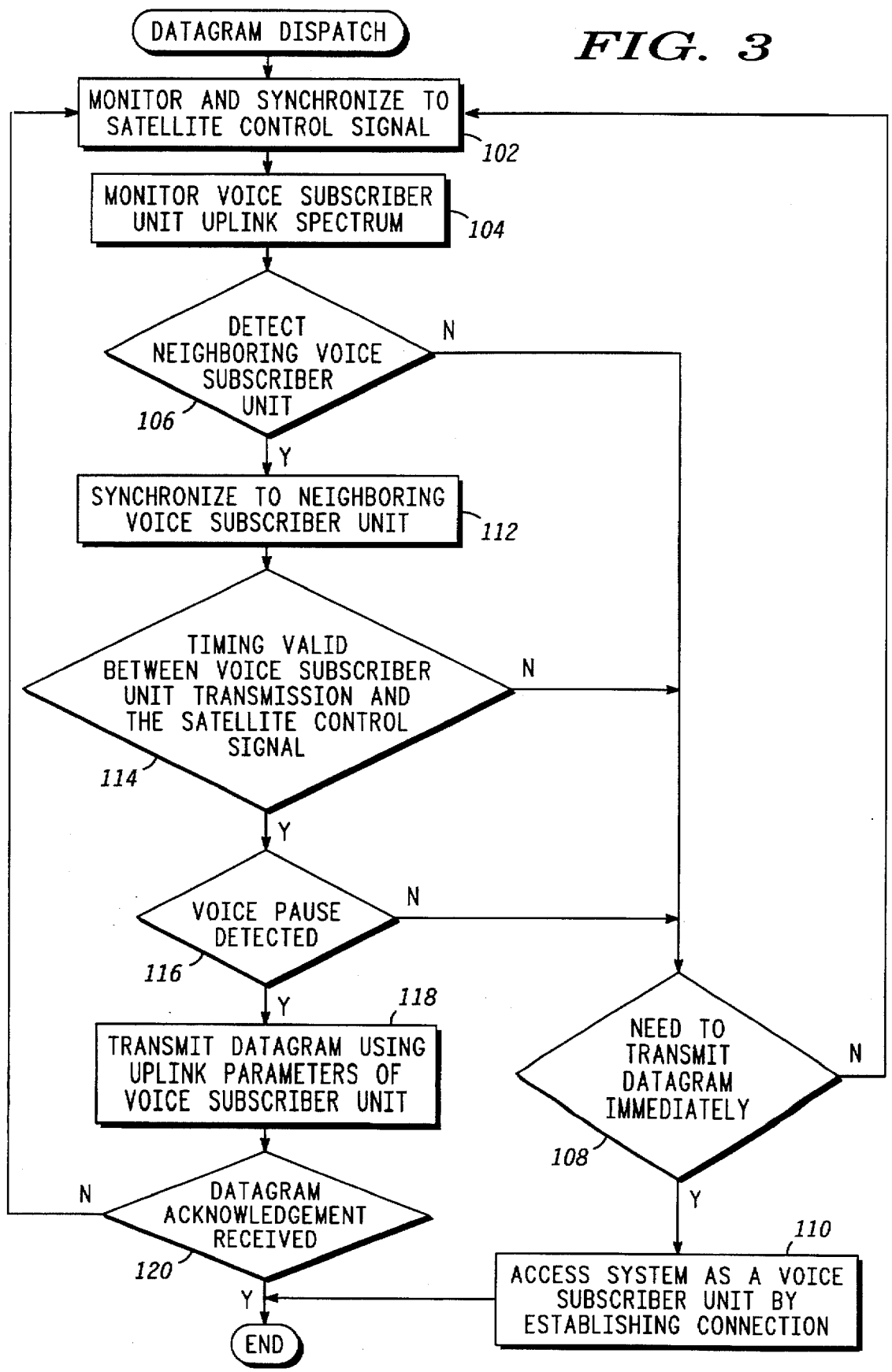
FIG. 3 shows a flowchart of a data subscriber unit's process of transmitting data during voice pauses, in accordance with a preferred embodiment of the present invention.

FIG. 3 shows a flowchart of a data subscriber unit's process of transmitting a datagram during voice pauses, in accordance with a preferred embodiment of the present invention. A task 102 synchronizes DSU 31 with broadcast channel 18' of satellite 12. Monitoring broadcast channel 18' provides a periodic satellite transmission reference for DSU 31.

A task 104 monitors VSU's 26 uplink traffic channel spectrum to determine if a transmitting VSU is nearby. DSU 31 may employ methods such as power level analysis or spectral scanning of known uplink traffic channels 54. Techniques for spectrum analysis are well known in the art and are not described in this invention.

A query task 106 determines if DSU 31 has located an active VSU 26. When query task 106 does not locate an active VSU, then DSU 31 performs a query task 108. Query task 108 evaluates the immediacy of delivering the datagram. When query task 108 determines that delivery of the datagram is not immediate, then processing passes to a task 102 and the process repeats.

When query task 108 determines that delivery of the datagram must occur, then processing passes to a task 110 and DSU 31 establishes a dedicated communication link by proceeding through the link establishing steps as described above for VSU 26.

When query task 106 detects an active neighboring VSU 26, (i.e., DSU 31 detects the presence of uplink traffic channel 54'), DSU 31 performs a task 112. In task 112, DSU 31, in addition to having previously synchronized to broadcast channel 18' in task 102, synchronizes to uplink traffic channel 54' as transmitted by VSU 26. Although transmissions by VSU 26 on uplink traffic channel 54 may be aperiodic, when synchronized in conjunction with broadcast channel 18', the period of transmission opportunities available to VSU 26 for transmitting digitized voice bursts becomes apparent.

A query task 114 evaluates the timing relationship between uplink traffic channel 54' and broadcast channel 18' to determine whether DSU 31 is located in a region denoted as compatible communication parameter region 60 wherein the communication parameters as exhibited by VSU 26 are conducive for use by DSU 31 in transmitting a datagram or if DSU's 31 location falls outside of the compatibility region as shown by DSU 31' in FIG. 2. If query task 114 determines that the communication parameters employed by VSU 26 are incompatible in relation to the location of DSU 31, then processing passes to query task 108 to determine if datagram must be delivered immediately.

When query task 114 determines that communication parameters utilized by VSU 26 are also conducive for DSU 31, then processing passes to a query task 116. In query task 116, DSU 31 monitors uplink traffic channel 54' to determine when a voice pause occurs. If no voice pause occurs, processing passes back to query task 108 to determine if the datagram must immediately be delivered, thus requiring the establishment of a dedicated communication link as describe above. If it is not immediate that the datagram be delivered, then processing passes back to task 102 for continued verification of the presence of uplink traffic channel 54' and progresses down through other evaluation tasks to assure continued compatibility with derived communication parameters.

Upon the detection of a voice pause, processing passes to a task 118 wherein DSU 31, utilizing compatible communication parameters, transmits the appropriately addressed and packaged datagram using datagram uplink traffic channel 37.

In a query task 120, DSU 31 monitors broadcast channel 18' to determine if an acknowledgment was received from satellite 12 indicating that the datagram was successfully received. If the acknowledgment was not received by DSU 31, processing passes back to task 102 for the detection of a subsequent opportunity to transmit the datagram. Datagram processing then terminates until DSU 31 develops another datagram for injection and delivery in communication system 10.

In summary, the present invention provides a method for injecting datagrams into a communication system using an established communication channel by injecting datagrams on voice channels during voice pauses. A data subscriber unit shadows a voice subscriber unit and "learns" valid communication parameters from the voice subscriber unit. Upon a pause in voice traffic, a data subscriber unit injects a datagram into the communication system. The communication system then routes the datagram either directly with a more sophisticated nodal network, or indirectly by subsequent address processing before routing the datagram for delivery.

The present invention eliminates the need of building a connection requiring a complex process when only a small amount of data is to be delivered. The present invention has been described above with reference to preferred embodiments. However, those skilled in the art will recognize that changes and modifications may be made in these preferred embodiments without departing from the scope of the present invention. For example, base stations need not be orbiting satellites but may be terrestrial base stations employing substantially the same procedures as discussed above. Others may devise alternate procedures to accomplish substantially the same functions as those described herein. These and other changes and modifications which are obvious to those skilled in the art are intended to be included within the scope of the present invention.

What is claimed is:

1. A method of operating a datagram service in a communication system wherein a data subscriber unit utilizes an established traffic channel for introducing a datagram into said communication system, said method comprising the steps of:

generating a datagram for delivery in said communication system;

deriving compatible communication parameters for use in utilizing said established traffic channels;

introducing said datagram into said communication system using said compatible communication parameters;

a base station receiving said datagram;

said base station evaluating routing information contained in said datagram; and said base station routing said datagram according to said routing information.

2. A method as recited in claim 1 wherein said deriving compatible communication parameters step comprises the steps of:

searching for an established traffic channel;

monitoring said established traffic channel; and synchronizing said data subscriber unit to communication parameters of said established traffic channel.

3. A method as recited in claim 2 wherein said deriving compatible communication parameters step, further comprises the steps of:

prior to said searching step, monitoring a broadcast channel;

synchronizing said data subscriber unit to said broadcast channel; and following said synchronizing step, comparing said broadcast channel with communication parameters of said established traffic channel to determine if said communication parameters are compatible communication parameters.

4. A method as recited in claim 1 wherein said introducing said datagram step further comprises the step of:

monitoring said established traffic channel for a voice pause, said voice pause allowing said data subscriber unit to non-interferingly introduce said datagram into said communication system.

5. A method as recited in claim 4 wherein said introducing said datagram step further comprises the step of:

packaging said datagram with addressing information for routing through said communication system.

6. A method as recited in claim 4 wherein said introducing said datagram step further comprises the steps of:

monitoring a broadcast channel for receipt of an acknowledgment, said acknowledgment denoting non-interfering receipt of said datagram by said communication system; and when said acknowledgment is not received by said data subscriber unit, retransmitting said datagram.

7. A method of operating a datagram service in a communication system wherein a data subscriber unit utilizes an established traffic channel for introducing a datagram into said communication system, said method comprising the steps of:

generating a datagram for delivery in said communication system;

deriving compatible communication parameters for use in utilizing said established traffic channels;

introducing said datagram into said communication system using said compatible communication parameters;

a base station receiving said datagram; and said base station routing said datagram to a gateway for processing.

8. A method of transmitting a datagram in a communication system from a data subscriber unit to a base station during voice pauses in an established voice channel between a voice subscriber unit and said base station, said method comprising the steps of:

monitoring at said data subscriber unit a voice transmission from said voice subscriber unit to said base station over said established voice channel;

synchronizing said data subscriber unit to said voice transmission from said voice subscriber unit;

transmitting said datagram from said data subscriber unit to said base station over said established voice channel during said voice pauses from said voice subscriber unit over said established voice channel;

receiving at said base station said datagram; and transmitting said datagram from said base station to a ground control station, said ground control station determining a route for said datagram.

9. The method of claim 8, further comprising the step of:

subsequent to said receiving step, transmitting an acknowledgment from said base station to said data subscriber unit.

10. A method of transmitting a datagram in a communication system from a data subscriber unit to a base station during voice pauses in an established voice channel between a voice subscriber unit and said base station, said method comprising the steps of:

monitoring at said data subscriber unit a voice transmission from said voice subscriber unit to said base station over said established voice channel;

synchronizing said data subscriber unit to said voice transmission from said voice subscriber unit;

said data subscriber unit appending a destination to said datagram, said destination denoting routing instructions for said base station;

transmitting said datagram from said data subscriber unit to said base station over said established voice channel during said voice pauses from said voice subscriber unit over said established voice channel; and said base station routing said datagram to said destination.

11. A method of transmitting a datagram in a communication system from a data subscriber unit to a base station during voice pauses in an established voice channel between a voice subscriber unit and said base station, said method comprising the steps of:

monitoring at said data subscriber unit a voice transmission from said voice subscriber unit to said base station over said established voice channel;

synchronizing said data subscriber unit to said voice transmission from said voice subscriber unit;

transmitting said datagram from said data subscriber unit to said base station over said established voice channel during said voice pauses from said voice subscriber unit over said established voice channel;

said base station appending a destination to said datagram, said destination denoting routing instructions for said base station; and said base station routing said datagram to said destination.

12. A method of operating a data subscriber unit in a communication system, said method comprising the steps of:

generating a datagram for delivery in said communication system;

attempting to locate an established traffic channel;

if said established traffic channel is located then
(1a) deriving compatible communication parameters for use in utilizing said established traffic channel; and
(1b) introducing said datagram into said communication system using said compatible communication parameters; and if said established traffic channel is not located then
(2a) establishing a new traffic channel; and
(2b) introducing said datagram into said communication system using said new traffic channel.

13. A method as recited in claim 12 wherein said deriving compatible communication parameters step comprises the steps of:

searching for an established traffic channel;

monitoring said established traffic channel; and synchronizing said data subscriber unit to communication parameters of said established traffic channel.

14. A method as recited in claim 13 wherein said deriving compatible communication parameters step, further comprises the steps of:

prior to said searching step, monitoring a broadcast channel;

synchronizing said data subscriber unit to said broadcast channel; and following said synchronizing step, comparing said broadcast channel with communication parameters of said established traffic channel to determine if said communication parameters are compatible communication parameters.

15. A method as recited in claim 12 wherein said step (1b) further comprises the step of:

monitoring said established traffic channel for a voice pause, said voice pause allowing said data subscriber unit to non-interferingly introduce said datagram into said communication system.

16. A method as recited in claim 15 wherein said step (1b) further comprises the step of:

packaging said datagram with addressing information for routing through said communication system.

17. A method as recited in claim 15 wherein said step (1b) further comprises the step of:

monitoring a broadcast channel for receipt of an acknowledgment, said acknowledgment denoting non-interfering receipt of said datagram by said communication system; and when said acknowledgment is not received by said data subscriber unit, retransmitting said datagram.

* * * * *